United States Patent
Slaney

(10) Patent No.: US 11,098,652 B2
(45) Date of Patent: Aug. 24, 2021

(54) ISOLATION SEALS FOR GAS TURBINE ENGINES

(71) Applicant: United Technologies Corporation, Farmington, CT (US)

(72) Inventor: Brandon T. Slaney, Wethersfield, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 117 days.

(21) Appl. No.: 16/424,562

(22) Filed: May 29, 2019

(65) Prior Publication Data

US 2020/0378308 A1  Dec. 3, 2020

(51) Int. Cl.
 *F02C 7/28* (2006.01)
 *F01D 11/00* (2006.01)
 *F01D 25/26* (2006.01)

(52) U.S. Cl.
 CPC .............. *F02C 7/28* (2013.01); *F01D 11/005* (2013.01); *F01D 25/26* (2013.01); F05D 2240/11 (2013.01); F05D 2240/55 (2013.01); F05D 2300/10 (2013.01)

(58) Field of Classification Search
 CPC .......... F02C 7/28; F01D 11/005; F01D 11/00; F01D 25/26; F01D 25/24; F01D 25/28; F05D 2240/11; F05D 2240/55–2240/57; F05D 2300/10; F05D 2300/00
 USPC ...................................................... 277/355
 See application file for complete search history.

(56) References Cited

U.S. PATENT DOCUMENTS

| | | | |
|---|---|---|---|
| 3,121,995 A | | 2/1964 | Albani |
| 3,609,968 A | * | 10/1971 | Mierley ............... F01D 11/005 60/799 |
| 4,576,548 A | * | 3/1986 | Smed ................... F01D 11/005 415/137 |
| 5,288,020 A | | 2/1994 | Pirker |
| 8,657,563 B2 | * | 2/2014 | Hayton ................... F02K 1/822 415/108 |
| 10,087,843 B2 | * | 10/2018 | Budnick ............... F01D 25/243 |
| 10,428,689 B2 | * | 10/2019 | Schmidt .................... F02C 7/24 |
| 2011/0005234 A1 | * | 1/2011 | Hashimoto ............ F01D 25/30 60/796 |

FOREIGN PATENT DOCUMENTS

GB       2063189 A    6/1981

OTHER PUBLICATIONS

European Search Report for European Application No. 20165357.3, International Filing Date Mar. 24, 2020, dated Sep. 14, 2020, 7 pages.

* cited by examiner

Primary Examiner — Nathan Cumar
(74) Attorney, Agent, or Firm — Cantor Colburn LLP

(57) ABSTRACT

Isolation seals for gas turbine engines are described. The isolation seals include a first interface member configured to be fixedly attached to a first case structure, the first interface member being a full-hoop structure, a housing configured to be mounted to a second case structure, a connector pin arranged within the housing and moveable relative to the housing, and a second interface member located on an end of the connector pin, the second interface member being a full-hoop structure. The first interface member and the second interface member are engageable to form a seal therebetween.

18 Claims, 10 Drawing Sheets

ISOLATION SEALS FOR GAS TURBINE ENGINES

STATEMENT REGARDING FEDERALLY SPONSORED RESEARCH OR DEVELOPMENT

This invention was made with Government support awarded by the United States. The Government has certain rights in the invention.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The components of the gas turbine engine are mounted and housed within an engine case. The engine case may then be mounted, attached, or otherwise affixed to an airframe case. The airframe case may be part of or attached to an aircraft (e.g., a wing of an aircraft or aft portion of an aircraft). The airframe case may include elements such as thrust reversers, flaps, vents, and an exhaust nozzle. The exhaust nozzle is designed to direct output of the gas turbine engine away from the aircraft for the purpose of flight. The engine case and the airframe case are coupled together and a seal is used to prevent the hot gases of the gas turbine engine from ingesting into the airframe case. At the coupling, one or more seals may be used, which are configured to maintain and ensure the coupling between the two cases and to prevent hot gases from damaging other components (i.e., keep the hot gases directed toward and out the nozzle).

Elastomer isolation seals can enable assembly and mounting of an engine case and an exhaust portion of the airframe case to be mounted independently. Such elastomer isolation seals can absorb deflections in six degrees of freedom and may be substantially immune to deflections related to ducts and the cases. Moreover, the elastomer isolation seals can reduce overboard leakage to nearly zero, providing thrust and Thrust Specific Fuel Consumption ('TSFC') efficiencies. However, the temperatures at which these elastomer isolation seals must operate are beyond the material capability. That is, during operation, an isolation seal formed from an elastomer will typically fail due to the high temperature of operation. As such, as temperatures continue to increase in gas turbine engine operations, elastomer seals are less practical. Thus, an alternative may be advantageous to enable freedom of movement/deflection between cases while also reducing or eliminating leakage.

BRIEF DESCRIPTION

According to some embodiments, isolation seals for gas turbine engines are provided. The isolation seals include a first interface member configured to be fixedly attached to a first case structure, the first interface member being a full-hoop structure, a housing configured to be mounted to a second case structure, a connector pin arranged within the housing and moveable relative to the housing, and a second interface member located on an end of the connector pin, the second interface member being a full-hoop structure. The first interface member and the second interface member are engageable to form a seal therebetween.

In addition to one or more of the features described above, or as an alternative, further embodiments of the isolation seals may include a biasing member arranged within the housing, the biasing member configured to urge the second interface member away from the housing.

In addition to one or more of the features described above, or as an alternative, further embodiments of the isolation seals may include at least one first retaining element configured to fixedly attach the first interface member to the first case structure.

In addition to one or more of the features described above, or as an alternative, further embodiments of the isolation seals may include at least one second retaining element configured to fixedly attach the housing to the second case structure.

In addition to one or more of the features described above, or as an alternative, further embodiments of the isolation seals may include that the first interface member and the second interface member are each formed of metal.

According to some embodiments, gas turbine engines are provided. The gas turbine engines include a first case structure, a second case structure, and an isolation seal arranged between the first case structure and the second case structure and provide sealing engagement therebetween. The isolation seal includes a first interface member configured to be fixedly attached to the first case structure, the first interface member being a full-hoop structure, a housing configured to be mounted to the second case structure, a connector pin arranged within the housing and moveable relative to the housing, and a second interface member located on an end of the connector pin, the second interface member being a full-hoop structure. The first interface member and the second interface member are engageable to form a seal therebetween.

In addition to one or more of the features described above, or as an alternative, further embodiments of the gas turbine engines may include a biasing member arranged within the housing, the biasing member configured to urge the second interface member away from the housing.

In addition to one or more of the features described above, or as an alternative, further embodiments of the gas turbine engines may include at least one first retaining element configured to fixedly attach the first interface member to the first case structure.

In addition to one or more of the features described above, or as an alternative, further embodiments of the gas turbine engines may include at least one second retaining element configured to fixedly attach the housing to the second case structure.

In addition to one or more of the features described above, or as an alternative, further embodiments of the gas turbine engines may include that the first interface member and the second interface member are each formed of metal.

In addition to one or more of the features described above, or as an alternative, further embodiments of the gas turbine engines may include that the first case structure is an engine case and the second case structure is an exhaust nozzle.

In addition to one or more of the features described above, or as an alternative, further embodiments of the gas turbine engines may include a secondary seal arranged between a portion of the second interface member and the first case structure.

In addition to one or more of the features described above, or as an alternative, further embodiments of the gas turbine engines may include a plurality of additional housings and a plurality of additional connector pins, wherein each of the additional connector pins engages to the second interface member.

In addition to one or more of the features described above, or as an alternative, further embodiments of the gas turbine engines may include that the first case structure comprises a bypass liner and the second case structure comprises an inner exhaust liner.

In addition to one or more of the features described above, or as an alternative, further embodiments of the gas turbine engines may include a flowpath seal configured to join and seal the bypass liner to the inner exhaust liner.

In addition to one or more of the features described above, or as an alternative, further embodiments of the gas turbine engines may include that a portion of a bypass duct is defined between the isolation seal and at least one of the bypass liner and the inner exhaust liner.

In addition to one or more of the features described above, or as an alternative, further embodiments of the gas turbine engines may include that the location of the isolation seal is downstream along the bypass duct from a combustor section of the gas turbine engine.

In addition to one or more of the features described above, or as an alternative, further embodiments of the gas turbine engines may include that the isolation seal provides sealing engagement between the first interface member and the second interface member when the first case structure and the second case structure during relative movement therebetween.

In addition to one or more of the features described above, or as an alternative, further embodiments of the gas turbine engines may include that the relative movement is at least one of axial, radial, and angular.

In addition to one or more of the features described above, or as an alternative, further embodiments of the gas turbine engines may include that the relative movement comprises each of axial relative movement, radial relative movement, and angular relative movement.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
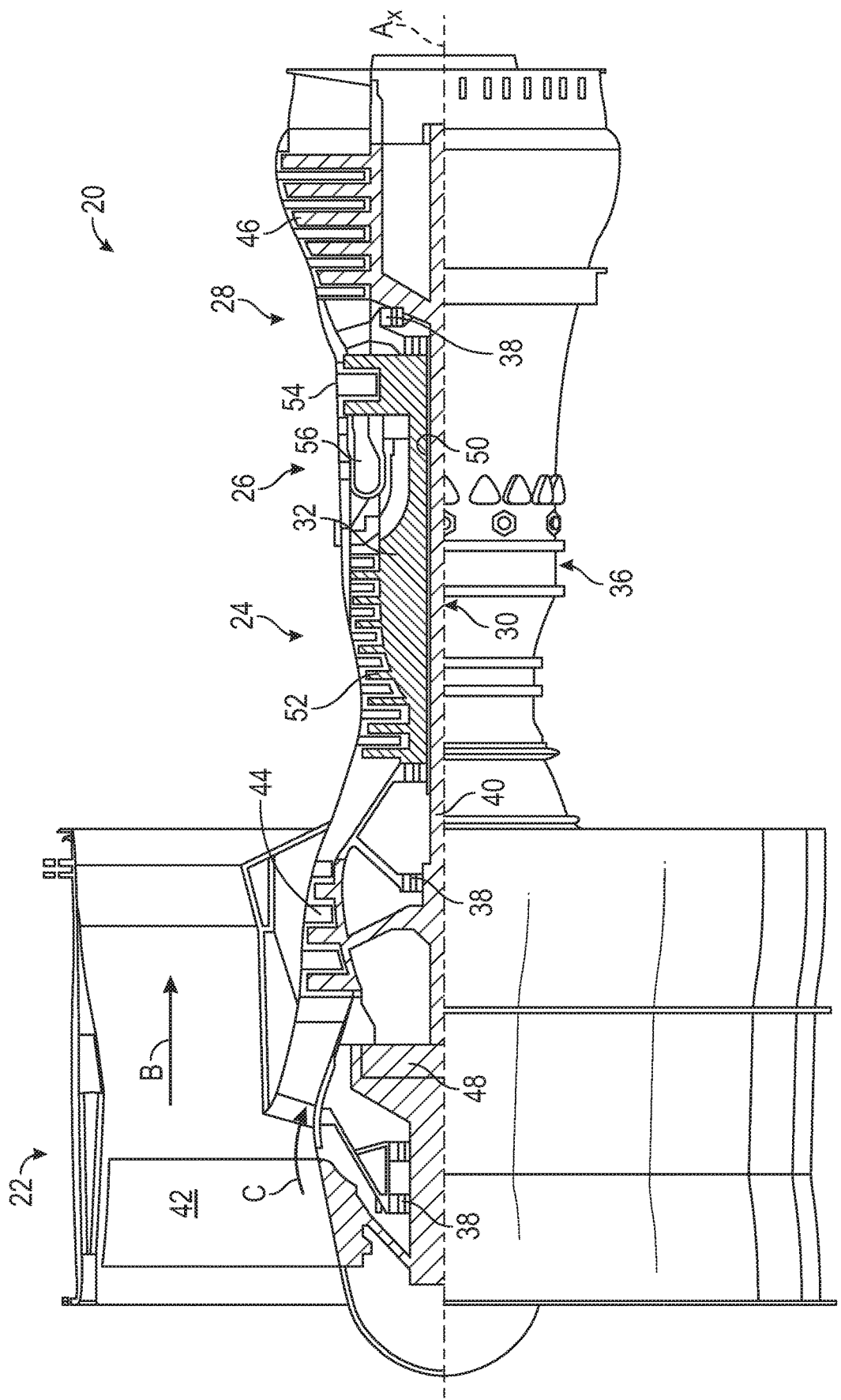
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. With reference to FIG. 1, as used herein, "aft" refers to the direction associated with the tail (e.g., the back end) of an aircraft, or generally, to the direction of exhaust of the gas turbine engine (to the right in FIG. 1). The term "forward" refers to the direction associated with the nose (e.g., the front end) of an aircraft, or generally, to the direction of flight or motion (to the left in FIG. 1). An axial direction A is along an engine central longitudinal axis $A_x$ (left and right on FIG. 1). Further, radially inward refers to a negative radial direction relative to the engine axis $A_x$ and radially outward refers to a positive radial direction (radial being up and down in the cross-section of the page of FIG. 1). A circumferential direction C is a direction relative to the engine axis $A_x$ (e.g., a direction of rotation of components of the engine; in FIG. 1, circumferential is a direction into and out of the page, when offset from the engine axis $A_x$). An A-R-C axis is shown throughout the drawings to illustrate the relative position of various components.

The exemplary engine 20 generally includes a low speed spool 30 and a high speed spool 32 mounted for rotation about the engine central longitudinal axis $A_x$ relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. In this illustrative example, the inner shaft 40 is connected to the fan 42 through a speed change mechanism, which in this gas turbine engine 20 is arranged with a geared architecture 48 to drive the fan 42 at a lower speed than the low speed spool 30. Those of skill in the art will appreciate that alternative architectures are possible without departing from the scope of the present disclosure. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis $A_x$ which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram °R})/(518.7°R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, etc.

Figure 2:
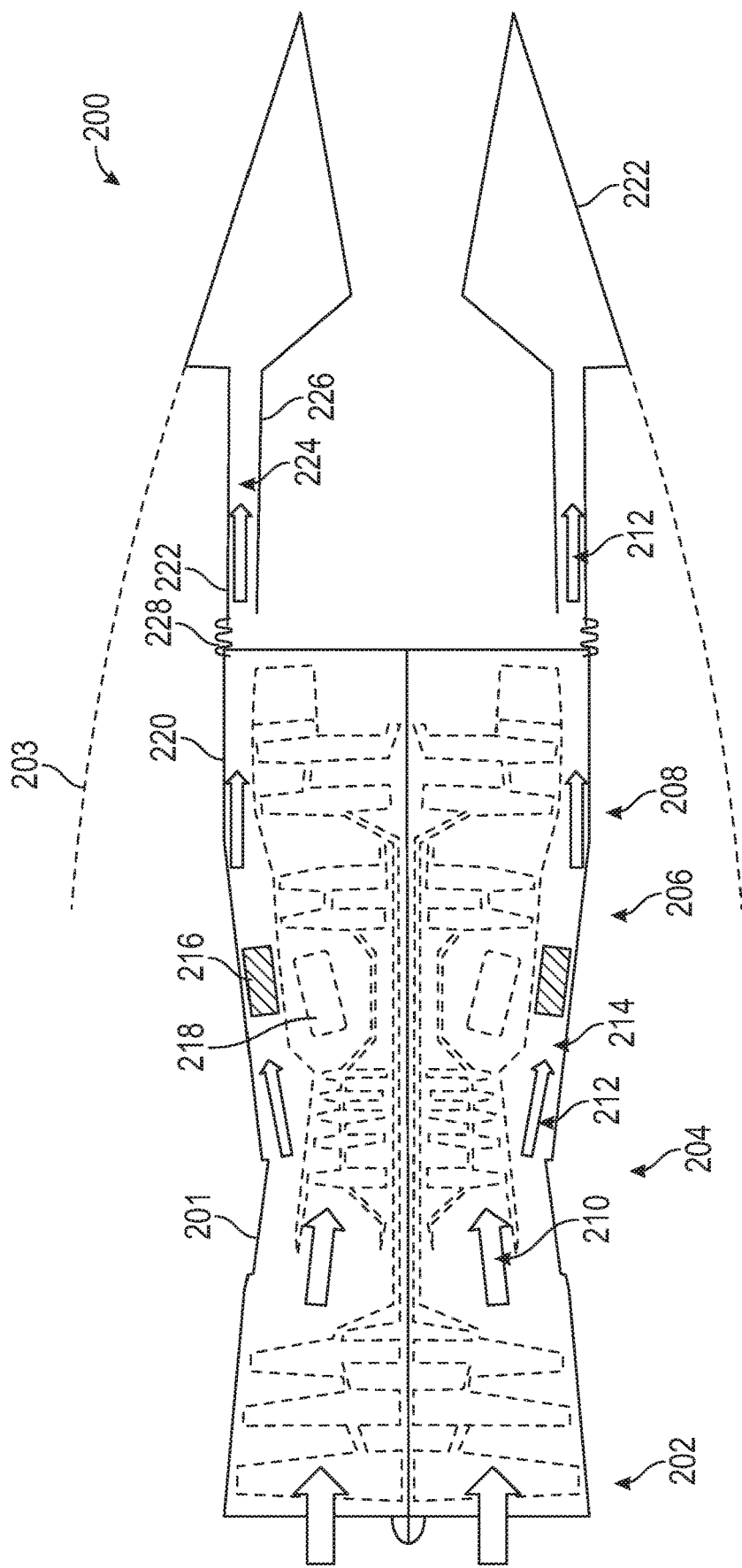
FIG. 2 is a schematic illustration of an engine that may incorporate embodiments of the present disclosure.

Turning now to FIG. 2, a schematic illustration of an engine 200 is shown. The engine 200 may be similar to that shown and described with respect to FIG. 1, with the engine 200 having gas turbine engine 201 having a fan section 202, a compressor section 204, a combustor section 206, and a turbine section 208. A core flow of air 210 will be directed into the compressor section 204 and into the combustor section 206, as will be appreciated by those of skill in the art. A bypass flow of air 212 be directed into a bypass duct 214. The bypass duct 214 may include a heat exchanger 216 to enable cooling, such as to a combustor 218 of the combustor section 206. The air within the bypass duct 214 will thus be heated by absorbing thermal energy from around the combustor section 206. The sections 202, 204, 206, 208 of the gas turbine engine 201 may be housed within an engine case 220, as will be appreciated by those of skill in the art.

The gas turbine engine 201 is housed within an airframe case 203. The airframe case 203 may be configured to mount to an aircraft body (e.g., on a wing or within a central frame of an aircraft). The airframe case 203 includes an exhaust nozzle 222 which is configured to direct and channel an exhaust from the gas turbine engine 201. As illustratively shown, the bypass flow of air 212 is directed into a portion of the exhaust nozzle 222. For example, the exhaust nozzle 222 may define an outer exhaust duct 224 that receives the bypass flow of air 212. The outer exhaust duct 224 may be defined, in part, by an inner exhaust liner 226. The exhaust nozzle 222 may be variable or fixed, as will be appreciated by those of skill in the art.

The exhaust nozzle 222 of the airframe case 203 is attached to the engine case 220 by an isolation seal 228. The isolation seal 228 may be a single piece or group of pieces/components that form an annular seal to join the exhaust nozzle 222 of the airframe case 203 to the engine case 220. The isolation seal 228 may be formed from various suitable materials, including, but not limited to metals and/or elastomers. As noted above, an elastomeric isolation seal may be difficult to implement due to thermal limitations of the elastomer materials.

Figure 3A:
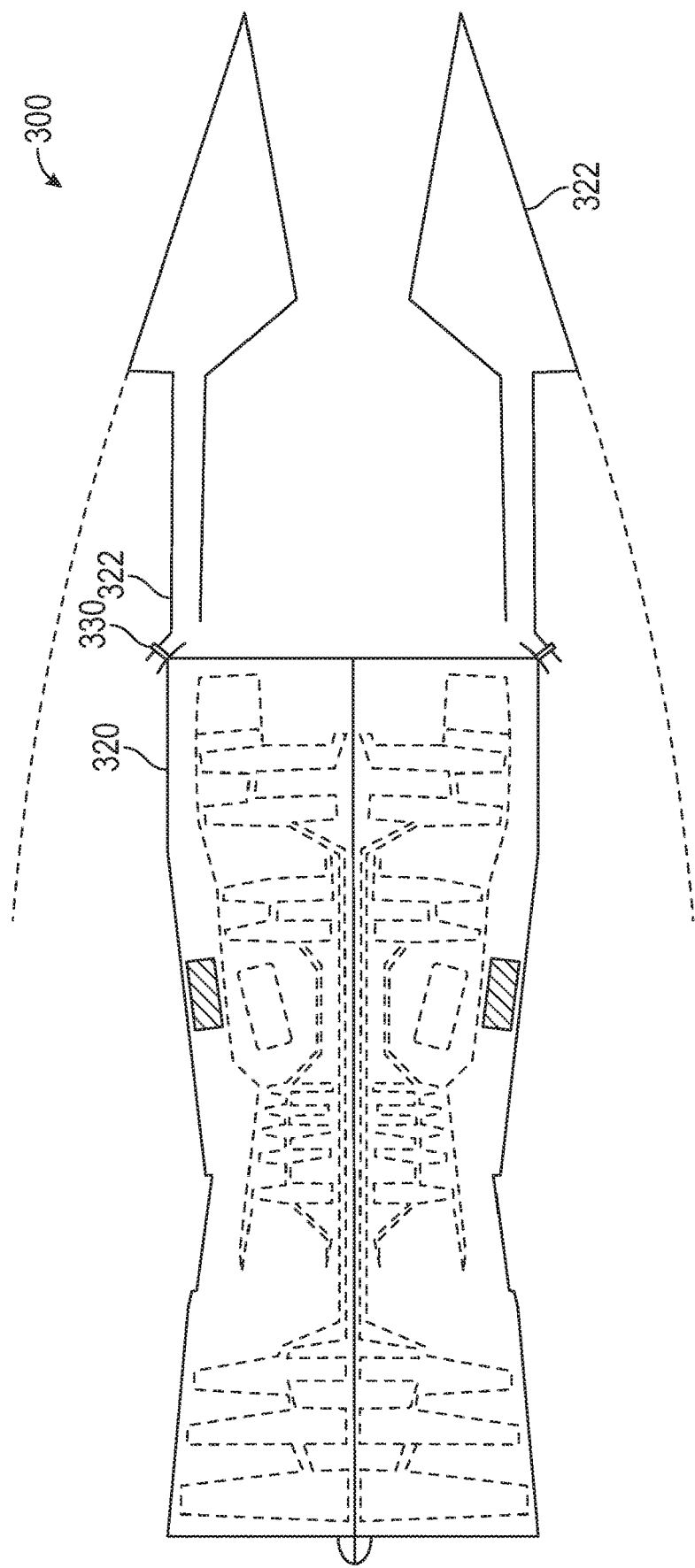
FIG. 3A is a schematic illustration of an engine having an isolation seal in accordance with an embodiment of the present disclosure.
Figure 3B:
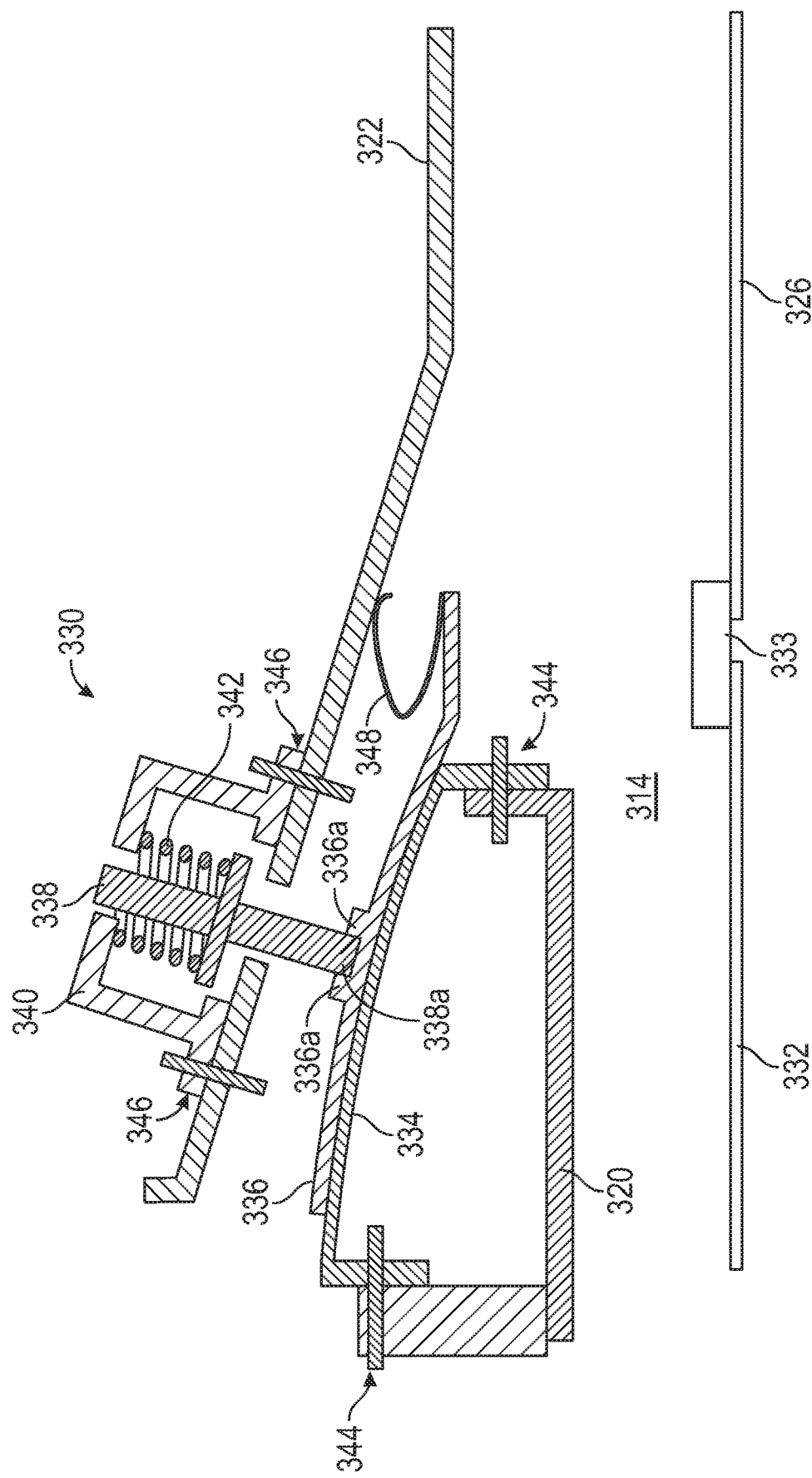
FIG. 3B is an enlarged schematic illustration of the isolation seal of FIG. 3A.

Turning now to FIGS. 3A-3B, schematic illustrations of an engine 300 having an isolation seal 330 in accordance with an embodiment of the present disclosure are shown. The engine 300 is substantially similar to that shown and described above, and thus similar features will not be labeled or discussed again, for convenience and clarity. As shown in FIG. 3A, the engine 300 includes an exhaust nozzle 322 that is connected to an engine case 320 by the isolation seal 330. In this embodiment, the isolation seal 330 is a translating spherical isolation seal that can withstand high temperature operation and allow for freedom of movement between the exhaust nozzle 322 and the engine case 320. FIG. 3B is an enlarged illustration of the isolation seal 330.

As shown in FIG. 3B, the exhaust nozzle 322 is mounted to a portion of the engine case 320. An inner exhaust liner 326 and a bypass liner 332 define, in part, a bypass duct 314 for bypass air to flow through. The inner exhaust liner 326 may be sealed to the bypass liner 332 by a flowpath seal 333. At the joining or connection of the exhaust nozzle 322 and the engine case 320 is the isolation seal 330. In this embodiment, the isolation seal 330 forms or defines a spherical interface (e.g., ball-and-socket joint) to absorb the rotation degrees of freedom, translate axially, and accommodate radial deflection.

The isolation seal 330 includes a first interface member 334 that is mounted to or fixedly connected to the engine case 320. Further, the isolation seal 330 includes a second interface member 336 that is mounted to or movably connected to the exhaust nozzle 322. The second interface member 336 is movable (e.g., rotation, tilts, translation) relative to the first interface member 334. In this embodiment, the second interface member 336 is attached to a connector pin 338. The connector pin 338 is housed within a housing 340 that is mounted to, fixed to, or integrally formed with the exhaust nozzle 322. In this embodiment, the connector pin 338 is spring-loaded by a biasing member 342. The biasing member 342 is configured to ensure and maintain engagement of the second interface member 336 to the first interface member 334 during relative movement between the engine case 320 and the exhaust nozzle 322. That is, the biasing member 342 is arranged to urge the second interface member 336 radially inward (relative to an engine axis) and toward the first interface member 334. For example, the biasing member 342 may be configured and arranged to be biased outward from the housing 340 such that the biasing member 342 ensures a radially inward force to maintain sealing engagement of the second interface member 336 against the first interface member 334.

In this illustrative embodiment, the first interface member 334 is mounted to the engine case 320. That is, as shown, one or more first retaining elements 344 can provide for fixed and secure connection of the first interface member 334 to the engine case 320. The first retaining elements 344 can include brackets, supports, fasteners, welds, adhesives, etc. to ensure that the first interface member 334 is structurally attached and supported on the engine case 320.

The second interface member 336 is disposed at an end of the connector pin 338. In some embodiments, the second interface member 336 and the connector pin 338 are an integral or single piece. In other embodiments, the second interface member 336 may be attached to the connector pin 338 by known means, such as fasteners, welds, brackets, supports, etc. For example, as shown in FIG. 3, the connector pin 338 may have a threaded end 338a that is engageable with a threaded boss 336a of the second interface member 336. One or more second retaining elements 346 can provide for fixed and secure connection of the housing 340 that supports the connector pins 338 to the exhaust nozzle 322. The second retaining elements 346 can include brackets, supports, fasteners, welds, adhesives, etc. to ensure that the housing 340 is structurally attached and supported on the exhaust nozzle 322. Because the connector pin 338 is spring-loaded by the biasing member 342, the second interface member 336 is able to move relative to the housing 340 and thus ensure continuous and continued engagement to the first interface member 334.

Each of the first interface member 334 and the second interface member are full-hoop structures that extend around a full circumference of the respective engine component (engine case 320 and exhaust nozzle 322). The connector pins 338 may be spaced about the circumference at specific and predetermined locations, to provide for sufficient force and retention for operation of the isolation seal 330. It is noted that this is an isolation seal, and thus sealing engagement between the first interface member 334 and the second interface member 336 must be maintained. Furthermore, in some embodiments, an optional secondary seal 348 can be arranged between a portion of the second interface member 336 and the exhaust nozzle 322. In operation, hot gas, at high pressure, will flow through the bypass duct 314, and the isolation seal 330 is configured to prevent any such air from bleeding through the connection of the exhaust nozzle 322 to the engine case 320.

Turning now to FIGS. 4A-4D, schematic illustrations of orientations of an isolation seal 430 in accordance with an embodiment of the present disclosure are shown.

Figure 4A:
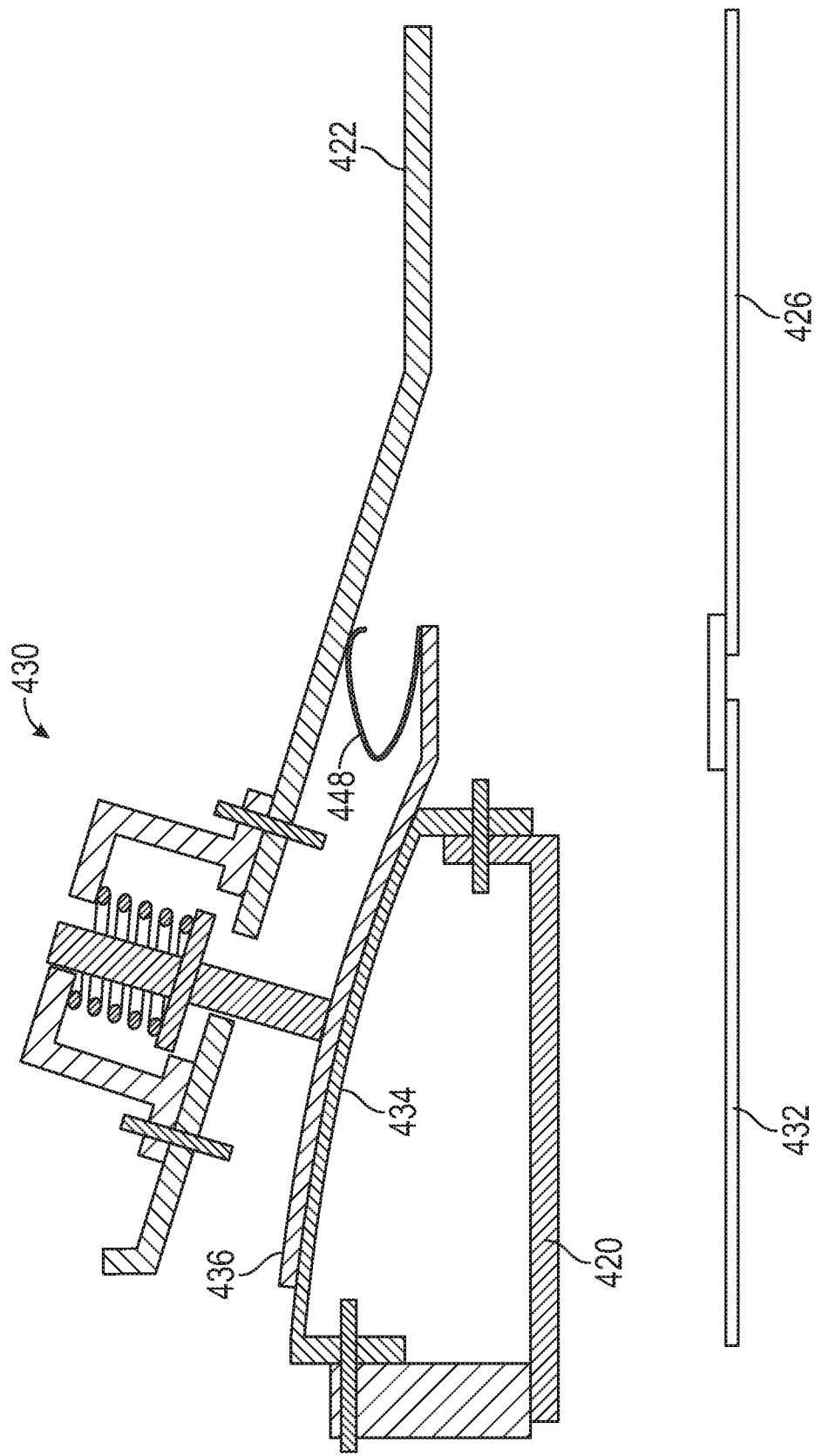
FIG. 4A is a schematic illustration of an isolation seal in accordance with an embodiment of the present disclosure in an undeflected state.

FIG. 4A illustrates a cold, assembled state of the isolation seal 430, wherein there is no deflection between an exhaust nozzle 422 and an engine case 420 or between an inner exhaust liner 426 and a bypass liner 432. The isolation seal 430 includes a first interface member 434 that is sealingly engageable with a second interface member 436, as described above. As shown, a secondary seal 448 is arranged between the second interface member 436 and a surface of the exhaust nozzle 422.

Figure 4B:
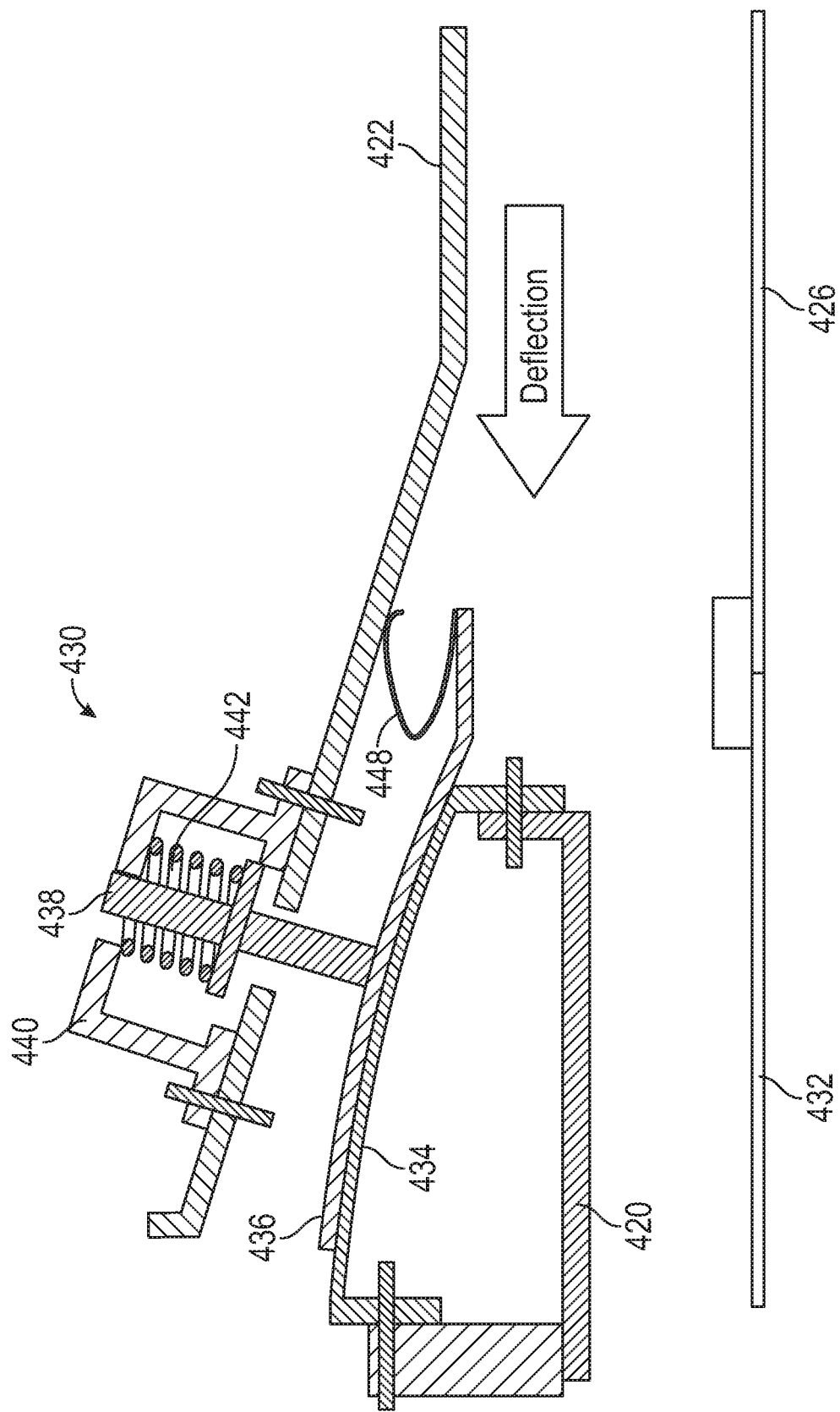
FIG. 4B is a schematic illustration of the isolation seal of FIG. 4A in an axially deflected state.

FIG. 4B illustrates an axial deflection of the exhaust nozzle 422 translating axially toward the engine case 420. As shown, a biasing member 442 compresses and a connector pin 438 moves within and/or relative to a housing 440. That is, as the exhaust nozzle 422 translates axially toward the engage case 420, the connector pin 438 and the biasing member 442 may absorb or accommodate such relative movement while maintaining a seal between the first interface member 434 and the second interface member 436. It is noted that the secondary seal 448 may compress, as well, between the exhaust nozzle 422 and a portion of the second interface member 436.

Figure 4C:
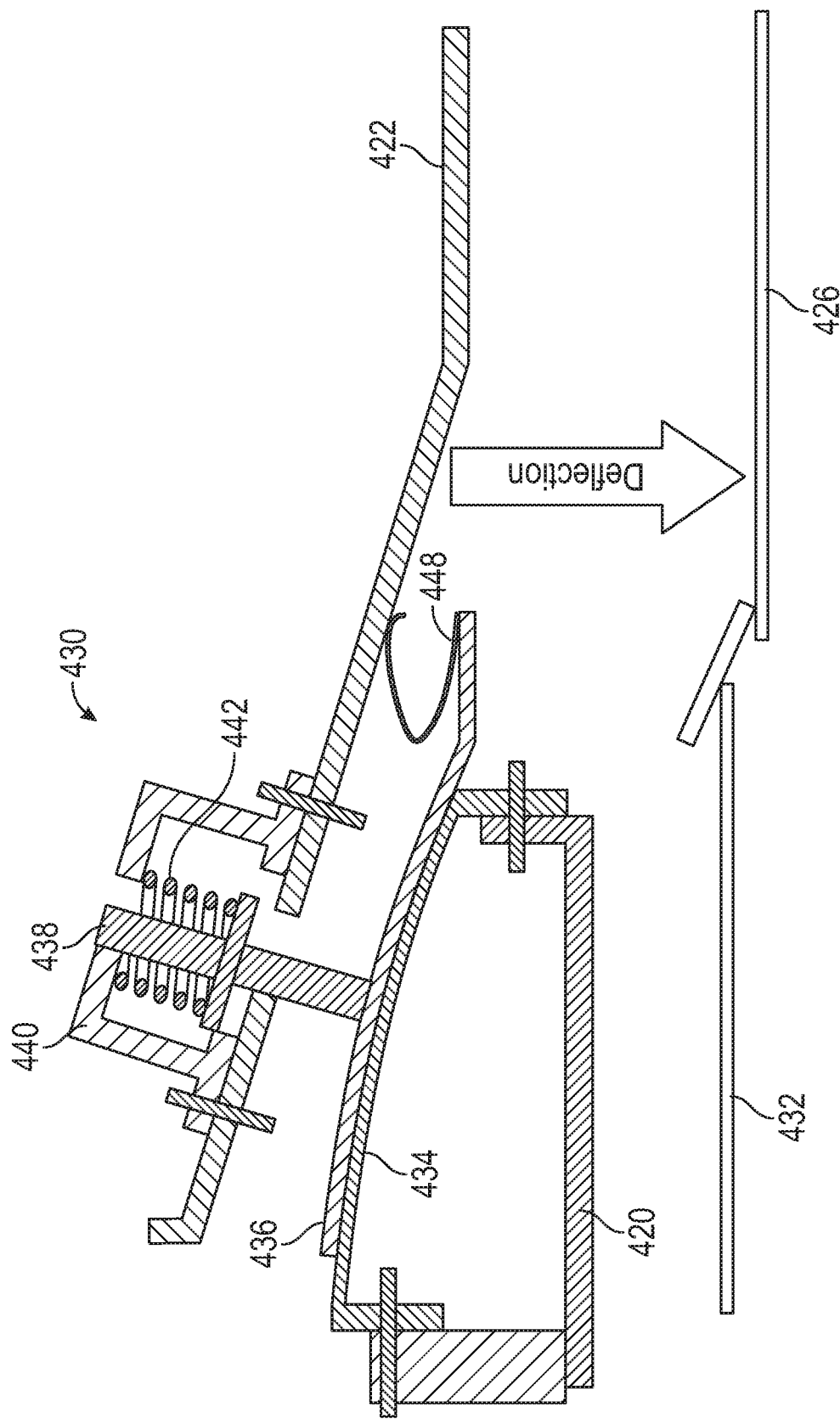
FIG. 4C is a schematic illustration of the isolation seal of FIG. 4A in a radially deflected state.

FIG. 4C illustrates a radial deflection of the exhaust nozzle 422 translating radially such that an axis through the exhaust nozzle 422 would be offset from an axis through the engine case 420. As shown, the second interface member 436 has moved radially relative to the exhaust nozzle 422 (e.g., downward on the image). The secondary seal 448 is compressed and the inner exhaust liner 426 has moved relative to the bypass liner 432. Further, as shown, a connector pin 438 may be shifted within a housing 440 and a biasing member 442 may be compressed. Although shown with a downward deflection, it will be appreciated that on the other side of the engine, the deflection will be relatively "upward." Because the biasing member 442 is biased radially inward (out of the housing 440), the contact between the first and second interface members may be maintained.

Figure 4D:
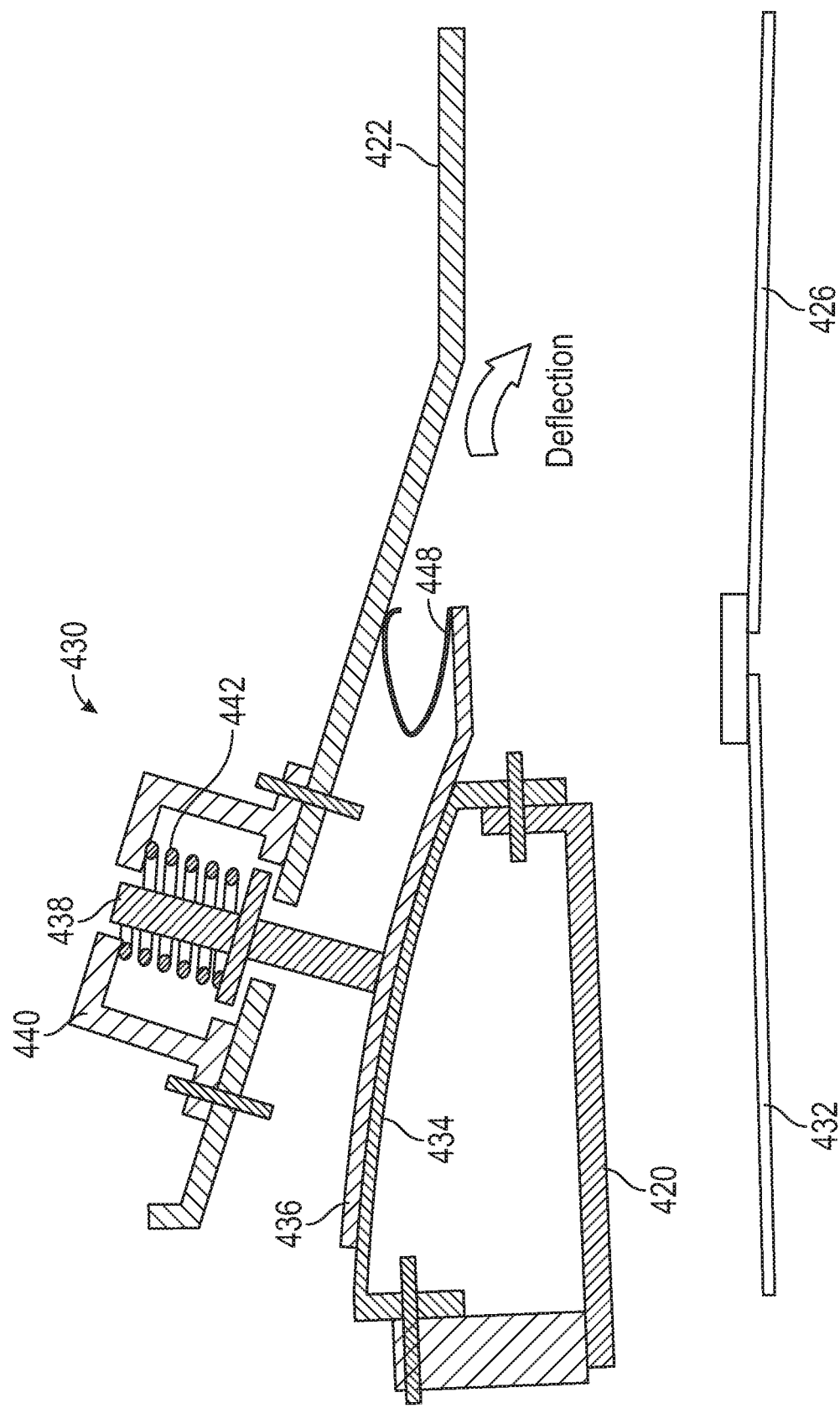
FIG. 4D is a schematic illustration of the isolation seal of FIG. 4A in an angular deflected state.

FIG. 4D illustrates an angular deflection of the exhaust nozzle 422 rotating relative to the engine case 420. As shown, the second interface member 436 has moved along the first interface member 434, but maintains sealing contact therebetween. The secondary seal 448 is compressed and the inner exhaust liner 426 has moved relative to the bypass liner 432. Further, as shown, a connector pin 438 may be shifted within a housing 440 and a biasing member 442 may be expanded.

Figure 5A:
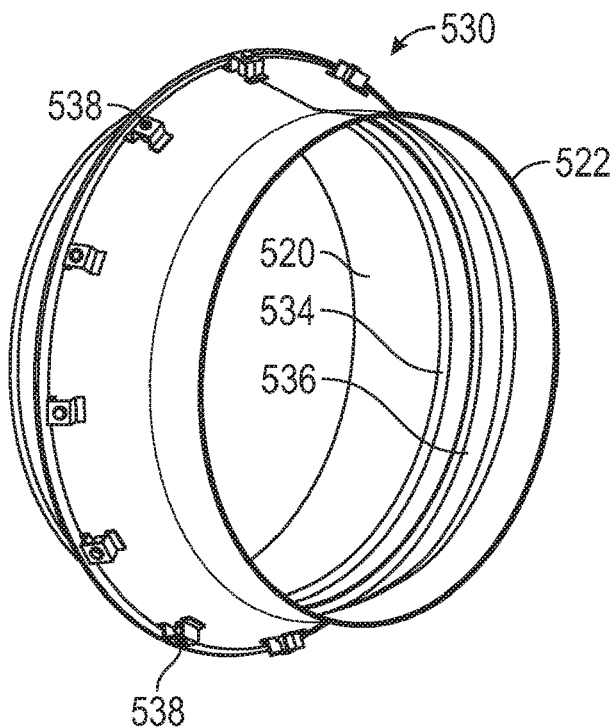
FIG. 5A is a schematic isometric illustration of an isolation seal in accordance with an embodiment of the present disclosure.
Figure 5B:
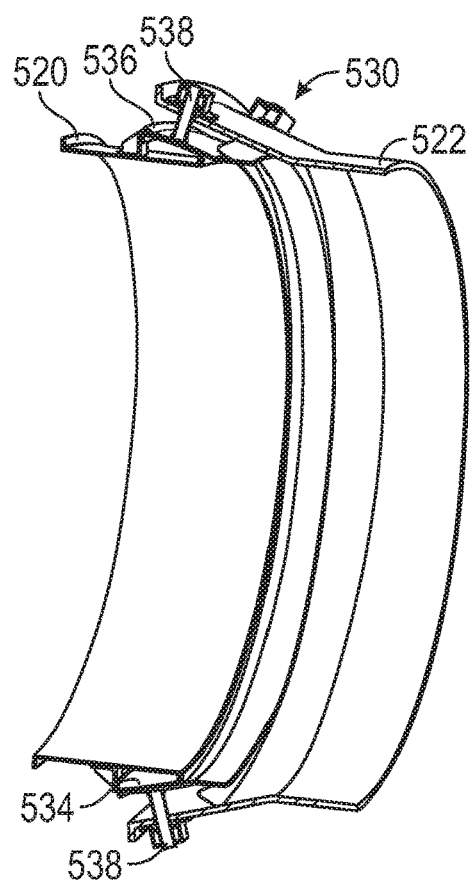
FIG. 5B is a cut-away sectional illustration of the isolation seal of FIG. 5A.
Figure 5C:
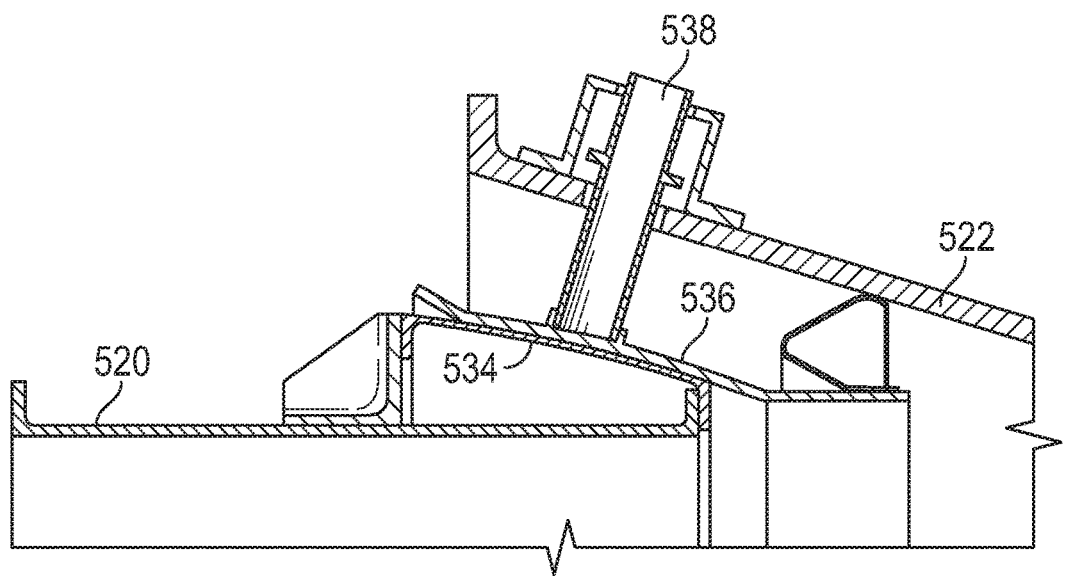
FIG. 5C is an enlarged sectional illustration of the isolation seal of FIG. 5A.
Figure 5D:
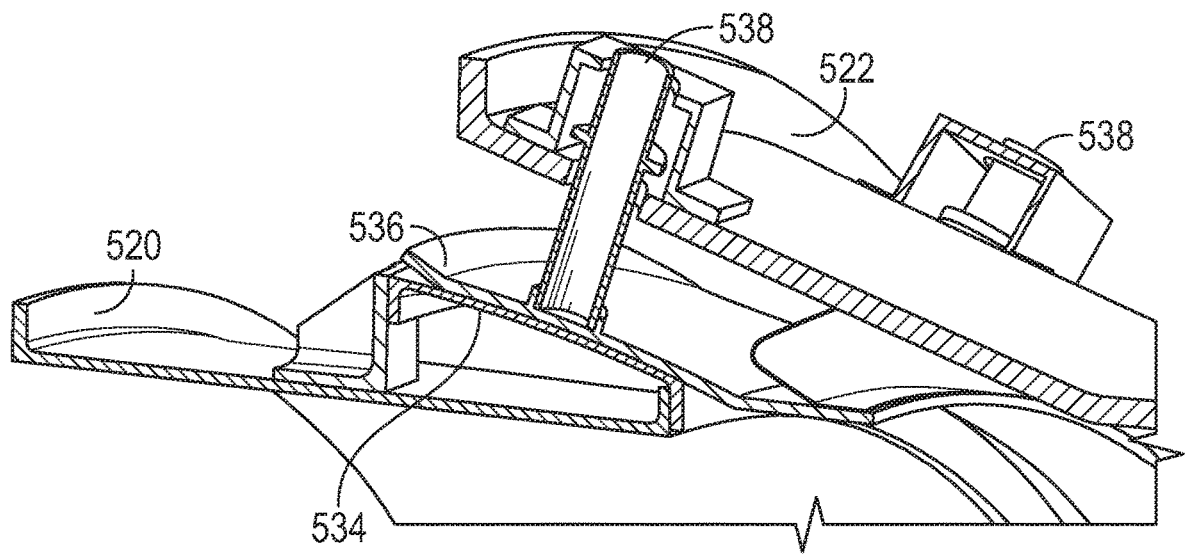
FIG. 5D is an enlarged isometric sectional illustration of the isolation seal of FIG. 5A.

FIGS. 5A-5D illustrate schematic views of an isolation seal 530 in accordance with an embodiment of the present disclosure. The isolation seal 530 may be similar as that described above and is configured to provide sealing engagement and contact between an engine case 520 and an exhaust nozzle 522. The isolation seal 530 includes a first interface member 534 and a second interface member 536 that are arranged to maintain sealing contact therebetween during relative movement or orientation of the engine case 520 relative to the exhaust nozzle 522. The first interface member 534 is fixedly attached to or part of the engine case 520 and the second interface member 536 is moveably mounted to the exhaust nozzle 522. The second interface member 536 is disposed on the end of a connector pin 538 that is moveable mounted or affixed to the exhaust nozzle 522, as described above. As illustratively shown in FIGS. 5A-5D, a plurality of discrete connector pins 538 are arranged about the isolation seal 530 to ensure constant contact and sealing engagement between the first and second interface members 534, 536. FIGS. 5A-5B illustrate the full-hoop structure of the isolation seal 530 to provide full circumferential connection and contact at the joining of the engine case 520 and the exhaust nozzle 522.

Although shown and described above with respect to an engine case and an exhaust nozzle, those of skill in the art will appreciate that embodiments of the present disclosure are not so limited. Gas turbine engines may include other connections or similar connections, without a specific engine case or exhaust nozzle as a discrete part of the connection. That is, embodiments of the present disclosure are directed to a joining of a first case structure to a second case structure where relative movement therebetween is desired, while maintaining a seal. As such, the above described engine case is equivalent to a first case structure, with a first interface member mounted thereto. Further, the above described exhaust nozzle is equivalent to a second case structure, with a second interface member mounted thereto. Furthermore, although shown and described above with the second (movable) interface member mounted to the second case structure, such configuration is not to be limiting. For example, in some embodiments of the present disclosure, the moveable interface member may be mounted to the first case structure, and the fixed interface member may be mounted to the second case structure. In some such embodiments, a connecting pin would be biased by a biasing member in a radially outward direction to ensure constant contact and sealing engagement between the interface members.

Advantageously, the versatile isolation seal of the present disclosure can provide for improved performance of gas turbine engines, even at increased operating temperatures. For example, because the isolation seals described herein are based on a constant contact and sealing engagement between the first and second interface members, the interface members may be formed from metal and yet provide moveable engagement and sealing. The metal isolation seals may be full-hoop structures with full-hoop first and second interface members. In some embodiments, the movable interface member is biased radially inward (e.g., toward the second interface member) to ensure constant and sealing engagement between the movable and stationary interface members.

Advantageously, embodiments described herein can provide for improved gas turbine engine performance. For example, by enabling higher temperature application, the efficiency of the gas turbine engine will be improved. The higher temperature, as compared to elastomer isolation seals, may be achieved through the use of metal components, and particularly metals seals formed between the first and second interface members and using a metal secondary seal.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An isolation seal for a gas turbine engine, the isolation seal comprising:
    a first interface member configured to be fixedly attached to a first case structure, the first interface member being a full-hoop structure;
    a housing fixedly attached to and mounted to a second case structure by at least one retaining element:
    a connector pin arranged within the housing and moveable relative to the housing; and
    a second interface member directly connected to an end of the connector pin, the second interface member being a full-hoop structure,
    wherein the first interface member and the second interface member are engageable to form a seal therebetween.

2. The isolation seal of claim 1, further comprising a biasing member arranged within the housing, the biasing member configured to urge the second interface member away from the housing.

3. The isolation seal of claim 1, further comprising at least one additional retaining element configured to fixedly attach the first interface member to the first case structure.

4. The isolation seal of claim 1, wherein the first interface member and the second interface member are each formed of metal.

5. A gas turbine engine comprising:
    a first case structure;
    a second case structure; and
    an isolation seal arranged between the first case structure and the second case structure and provide sealing engagement therebetween, the isolation seal comprising:

a first interface member configured to be fixedly attached to the first case structure, the first interface member being a full-hoop structure;

a housing fixedly attached to and mounted to a second case structure by at least one retaining element:

a connector pin arranged within the housing and moveable relative to the housing; and a second interface member directly connected to an end of the connector pin, the second interface member being a full-hoop structure, wherein the first interface member and the second interface member are engageable to form a seal therebetween.

6. The gas turbine engine of claim 5, further comprising a biasing member arranged within the housing, the biasing member configured to urge the second interface member away from the housing.

7. The gas turbine engine of claim 5, further comprising at least one additional retaining element configured to fixedly attach the first interface member to the first case structure.

8. The gas turbine engine of claim 5, wherein the first interface member and the second interface member are each formed of metal.

9. The gas turbine engine of claim 5, wherein the first case structure is an engine case and the second case structure is an exhaust nozzle.

10. The gas turbine engine of claim 5, further comprising a secondary seal arranged between a portion of the second interface member and the second case structure.

11. The gas turbine engine of claim 5, further comprising a plurality of additional housings and a plurality of additional connector pins, wherein each of the additional connector pins engages to the second interface member.

12. The gas turbine engine of claim 5, wherein the first case structure comprises a bypass liner and the second case structure comprises an inner exhaust liner.

13. The gas turbine engine of claim 12, further comprising a flowpath seal configured to join and seal the bypass liner to the inner exhaust liner.

14. The gas turbine engine of claim 12, wherein a portion of a bypass duct is defined between the isolation seal and at least one of the bypass liner and the inner exhaust liner.

15. The gas turbine engine of claim 14, wherein the location of the isolation seal is downstream along the bypass duct from a combustor section of the gas turbine engine.

16. The gas turbine engine of claim 5, wherein the isolation seal provides sealing engagement between the first interface member and the second interface member when the first case structure and the second case structure during relative movement therebetween.

17. The gas turbine engine of claim 16, wherein the relative movement is at least one of axial, radial, and angular.

18. The gas turbine engine of claim 16, wherein the relative movement comprises each of axial relative movement, radial relative movement, and angular relative movement.

* * * * *